US007206550B2

(12) United States Patent
Li et al.

(10) Patent No.: US 7,206,550 B2
(45) Date of Patent: Apr. 17, 2007

(54) ANTENNA SUBSYSTEM CALIBRATION APPARATUS AND METHODS IN SPATIAL-DIVISION MULTIPLE-ACCESS SYSTEMS

(75) Inventors: Qinghua Li, Sunnyvale, CA (US); Xintian E Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 601 days.

(21) Appl. No.: 10/749,904

(22) Filed: Dec. 29, 2003

(65) Prior Publication Data

US 2005/0143014 A1   Jun. 30, 2005

(51) Int. Cl.
*H04B 1/00* (2006.01)
*H04B 7/00* (2006.01)

(52) U.S. Cl. ............................. 455/69; 455/68; 455/73; 455/127.2; 370/401; 370/282; 370/343

(58) Field of Classification Search .................. 455/68, 455/69, 73, 127.2, 232.1; 370/401, 282, 370/343

See application file for complete search history.

(56) References Cited

U.S. PATENT DOCUMENTS

| | | | |
|---|---|---|---|
| 5,515,378 A | 5/1996 | Roy, III et al. ............ 370/95.1 |
| 5,909,649 A | 6/1999 | Saunders ..................... 455/450 |
| 5,936,569 A | 8/1999 | Stahle et al. ................. 342/174 |
| 6,047,189 A | 4/2000 | Yun et al. .................... 455/452 |
| 6,549,585 B2 | 4/2003 | Naguib et al. .............. 375/267 |
| 6,593,880 B2 | 7/2003 | Velazquez et al. .......... 342/367 |
| 6,795,407 B2 * | 9/2004 | Chesson ..................... 370/311 |
| 2004/0146018 A1 * | 7/2004 | Walton et al. .............. 370/329 |
| 2005/0128953 A1 * | 6/2005 | Wallace et al. ............. 370/241 |
| 2005/0135403 A1 * | 6/2005 | Ketchum et al. ........... 370/437 |

* cited by examiner

*Primary Examiner*—Matthew Anderson
*Assistant Examiner*—Tuan Pham
(74) *Attorney, Agent, or Firm*—Schwegman, Lundberg, Woessner & Kluth, P.A.

(57) ABSTRACT

A wireless local area network (WLAN) includes an access point (AP), which provides communications channels to a plurality of stations. The AP supports spatial-division, multiple-access (SDMA) and accordingly includes a plurality of antenna subsystems. In order to achieve zero-forcing downlink beamforming, internal calibration procedures are occasionally performed within the AP. An internal calibration procedure includes an antenna subsystem transmitting a calibration signal. Received signals are measured at other antenna subsystems, and from these measurements, the transmit and receive chain gains are calculated for each antenna subsystem. One or more of these gains are adjusted to satisfy a primary condition, which is that the ratio of the transmit chain gain and the receive chain gain for all of the antenna subsystems are approximately equal (i.e., all of these ratios are equal to a calibration constant).

33 Claims, 9 Drawing Sheets

ANTENNA SUBSYSTEM CALIBRATION APPARATUS AND METHODS IN SPATIAL-DIVISION MULTIPLE-ACCESS SYSTEMS

TECHNICAL FIELD

The inventive subject matter pertains to wireless local area networks (WLANs) and, more particularly, to channel estimation in a WLAN system that uses a spatial-division multiple-access (SDMA) modulation scheme.

BACKGROUND

Spatial-division multiple-access (SDMA) is a technique used in some cellular telephone systems to increase the network throughput. In an SDMA system, an access point (AP) includes multiple antennas, which are used communicate with multiple mobile units simultaneously using different beam patterns. In comparison with other cellular systems that do not utilize SDMA, the throughput of an SDMA system can be multiplied by approximately the number of antennas at an AP, without the need for increased spectrum usage.

When an AP sends signals to a group of mobile units simultaneously, the AP pre-compensates for the interference (e.g., crosstalk) between mobile units so that each mobile unit only receives its intended signal without interference from the signals intended for other mobile units. Similarly, when the AP receives signals from a group of mobile units, the AP cancels the interference, and detects each of the individual units' data. This process of interference cancellation is referred to a zero-forcing beamforming.

In order to achieve zero-forcing beamforming, current SDMA systems require channel state information, which is acquired through closed-loop training procedures conducted between the mobile units and the AP. Because channel asymmetry exists between the uplink channel and the downlink channel, the training process involves two phases.

During one phase of training, each mobile unit, in turn, sends a signal to the AP. Based on the signals, the AP estimates an uplink channel attenuation matrix, which describes the gain characteristics between the input of the mobile units' transmit chains to the output of the AP's receive chains. During a second phase of training, the AP sends a signal to each mobile unit. Each mobile unit estimates the channel attenuation, and it returns this information to the AP. From this information, the AP estimates a downlink channel attenuation matrix, which describes the gain characteristics between the input of the AP's transmit chain to the output of the mobile units' receive chains. Because the channel is continuously and significantly changing, this training process is repeated frequently (e.g., at least every second up to every data packet).

The closed-loop training process is highly complex, and it consumes significant amounts of time, processing capacity, and bandwidth. In addition, the ever-changing channel conditions cause the attenuation matrices to almost instantly diverge from previous training values, which results in degraded system performance. Accordingly, there is a need in the art for methods and apparatus for performing zero-forcing beamforming, which do not involve resource-intensive training procedures. Further, there is a need in the art for methods and apparatus for performing zero-forcing beamforming, which are less likely to suffer from performance degradation resulting from ever-changing channel conditions.

BRIEF DESCRIPTION OF THE DRAWINGS

The appended claims point out, with particularity, different embodiments of the inventive subject matter described herein. However, the detailed description presents a more complete understanding of various embodiments of the inventive subject matter when considered in connection with the figures, wherein like-reference numbers refer to similar items throughout the figures and:

DETAILED DESCRIPTION

Various embodiments of the inventive subject matter described herein include methods and apparatus for providing spatial-division multiple-access communications between wireless devices and a wireless communication system. Embodiments of the inventive subject matter may be referred to, individually and/or collectively, herein by the term "invention" merely for convenience and without intending to voluntarily limit the scope of this application to any single invention or inventive concept if more than one is in fact disclosed.

Examples of various electronic systems and devices in which embodiments of the invention can be incorporated include, but are not limited to, wireless local area network (WLAN) systems, cellular telephone systems, radio networks, computers (e.g., desktop, laptop, hand-held, server, etc.), and wireless communication devices (e.g., cellular telephones, pagers, radios, etc.), to name a few. Embodiments of the invention could be used in other types of systems and/or devices, as well, as would be apparent to one of skill in the art based on the description herein. The inventive subject matter described herein is not intended to be limited to those systems and devices that are described in detail herein.

The inventive subject matter is described, below, in the context of a WLAN system. The scope of the inventive subject matter is not intended to be limited to such systems. Instead, as would be obvious to those of skill in the art based on the description herein, embodiments of the invention can be implemented in other types of wireless systems, as well.

Figure 1:
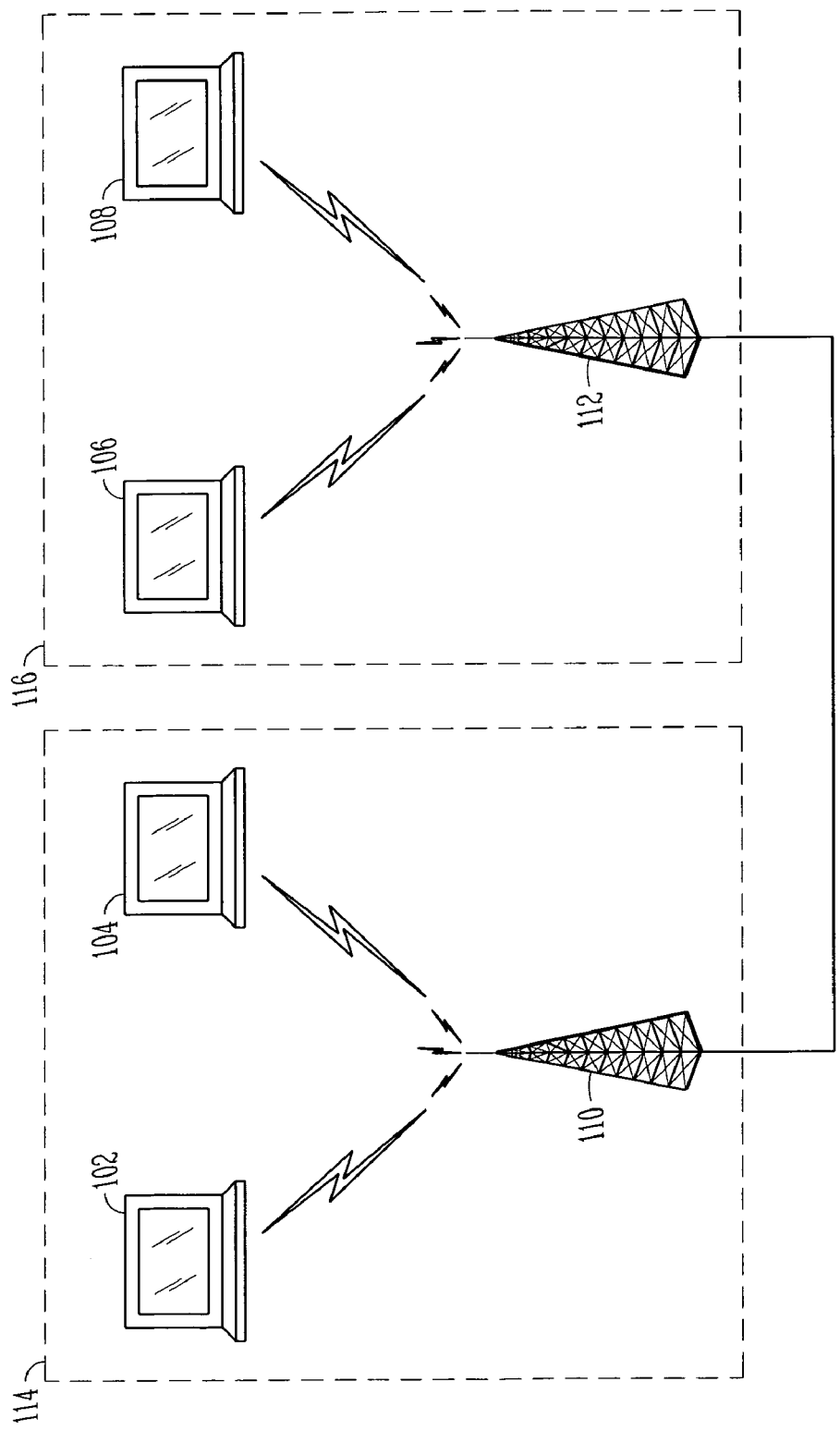
FIG. 1 is a simplified diagram of an example wireless local area network (WLAN) system, in accordance with an embodiment of the invention.

FIG. 1 is a simplified diagram of an example WLAN system, in accordance with an embodiment of the invention. A WLAN system may include multiple network stations 102, 104, 106, 108, and one or more access points (APs) 110, 112.

In a WLAN system, network stations 102, 104, 106, 108 communicate over the medium of free space, commonly referred to as the "air interface." Generally, a station 102, 104, 106, 108 may be referred to as a network adapter or network interface card (NIC). A station 102, 104, 106, 108 may be mobile, portable or stationary. For example, a station 102 may be a laptop computer, a handheld radio, a desktop computer, or virtually any other one-way or two-way device with the capability of communicating with other devices 102 or APs 110, 112 over a wireless medium.

A set of stations 102, 104, 106, 108 may communicate directly with each other, as is the case in a Basic Service Set (BSS). Alternatively, a set of stations 102, 104, 106, 108 may communicate with each other through an AP 110, 112. As illustrated in FIG. 1, a WLAN that includes one or more APs 110, 112 is referred to as an "infrastructure BSS." In an infrastructure BSS, all stations 102, 104, 106, 108 communicate with an AP 110, 112. The AP 110, 112 provides the connection to a wired local area network (LAN), if any, and the local relay function for the BSS. Accordingly, if a first station 102 wants to communicate with a second station 104, the first station 102 sends the communication to the AP 110, and the AP 110 relays the communication to the second station 104. An Extended Service Set (ESS) is a set of infrastructure BSSs, where the APs 110, 112 communicate among themselves to forward traffic from one BSS 114 to another BSS 116, and to facilitate the movement of stations 102, 104, 106, 108 from one BSS to another.

Besides a WLAN system, other types of wireless communication systems can implement various embodiments of the invention. Those systems may or may not include WLAN stations. In other systems, which incorporate embodiments of the invention, other wireless communication devices (e.g., cellular telephones, radios, pagers, etc.) can be used in addition to or in lieu of the stations described herein. In addition, the wireless communication devices can communicate with other types of wireless access points, such as a cellular base station or a satellite, for example.

Figure 2:
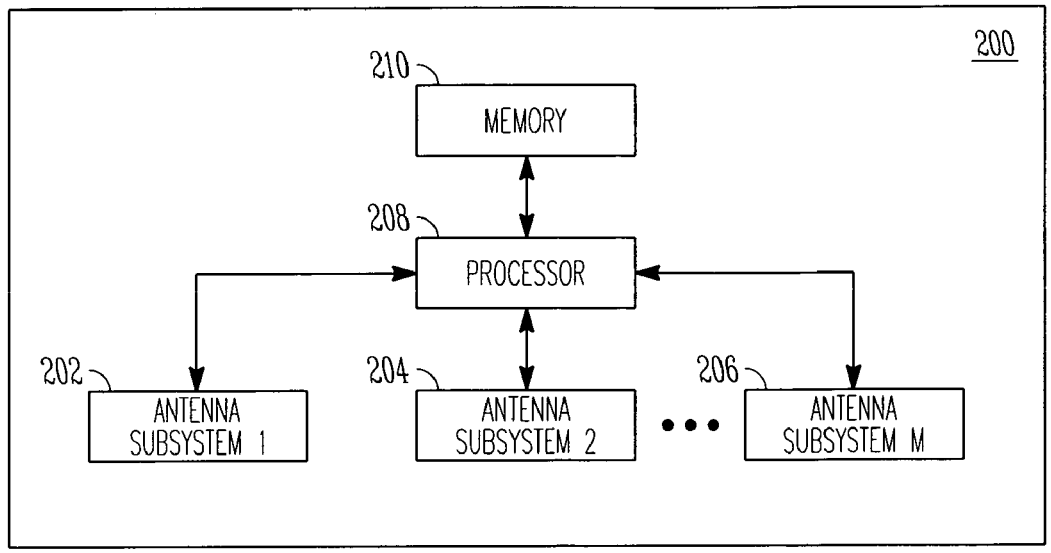
FIG. 2 is a simplified block diagram of an access point (AP), in accordance with an embodiment of the invention.

FIG. 2 is a simplified block diagram of an AP 200 (e.g., AP 110, FIG. 1), in accordance with an embodiment of the invention. An AP 200 provides communication channels to WLAN stations (e.g., stations 102, 104, 106, 108, FIG. 1), and interconnection with a wired LAN. As will be described in detail herein, AP 200 supports communications using SDMA.

SDMA is a technique that enables AP 200 to transmit to or receive from multiple stations (e.g., stations 102, 104, 106, 108, FIG. 1) simultaneously using different beampatterns. In particular, when AP 200 sends signals to a group of stations simultaneously, AP 200 pre-compensates for the interference between station signals, so that each station receives only its intended signal without interference from the signals intended for other stations. Similarly, when AP 200 receives signals from a group of stations, AP 200 cancels the interference and detects each individual station's data.

AP 200 may use any of a variety of multiple access techniques to communicate with multiple stations within a designated spectral range. For example, but not by way of limitation, AP 200 could support communications using frequency-division multiple-access (FDMA), time-division multiple-access (TDMA), and/or code-division multiple-access (CDMA), in various embodiments.

In one embodiment, AP 200 includes a plurality of antenna subsystems 202, 204, 206, a processor 208, and memory 210. Memory 210 stores various types of data, and can include random access memory (RAM), read only memory (ROM), numerous variations of those types of memories, and/or other types of storage. Processor 208 accesses information from memory 210. In addition, processor 208 sends information to and receives information from antenna subsystems 202, 204, 206. Processor 208 also initiates calibration procedures described in conjunction with various embodiments, analyzes signals produced during the calibration procedures, and causes gain adjustments in the transmit chains and/or the receive chains of the antenna subsystems 202, 204, 206. These calibration procedures will be described in more detail later.

Each antenna subsystem 202, 204, 206 includes a transmit chain, a receive chain, and an antenna (none shown), in one embodiment. An antenna subsystem 202, 204, 206 receives data from processor 208 and, via its transmit chain, converts that data into an analog signal, and it causes that data to be sent out over the air interface. In addition, via its receive chain, an antenna subsystem 202, 204, 206 receives data from the air interface, and it converts the data into a digital format that can be understood by processor 208.

Because it includes multiple antenna subsystems 202, 204, 206, AP 200 is capable of supporting SDMA. As will be described in detail later, methods of the various embodiments include an internal calibration procedure that enables AP 200 to achieve zero-forcing beamforming for the SDMA downlink.

During the internal calibration procedure, antenna subsystems 202, 204, 206 exchange calibration information amongst themselves. The AP 200 uses measurements of the transmitted calibration information to calibrate the various antenna subsystems' transmit and receive chains according to a "primary condition." The primary condition is that, for a given sub-carrier, the ratio of an antenna subsystem's transmit chain gain to its corresponding receive chain gain is constant for each antenna subsystem 202, 204, 206. This constant may be different for different sub-carriers. Several embodiments of the calibration procedure are described in detail later.

The calibration procedures of the various embodiments reduce or eliminate the need for performing the closed-loop training processes of the prior art. In addition, using embodiments of the invention, the stations (e.g., stations 102, 104, 106, 108, FIG. 1) do not participate in the calibration process. Thus, it is not necessary for each station to be equipped to perform a training procedure in order to implement zero-forcing beamforming in the system.

Although only three antenna subsystems 202, 204, 206, and one processor 208, and memory 406 are shown in FIG. 2 for ease of illustration, more of any or all of these components could be included in an AP 200, in various embodiments. In addition, other components can be included in the AP 200, which enable the AP 200 to perform its intended functions. For example, but not by way of limitation, AP 200 can also include components that enable it to communicate with other APs, and other wired or wireless networks.

Figure 3:
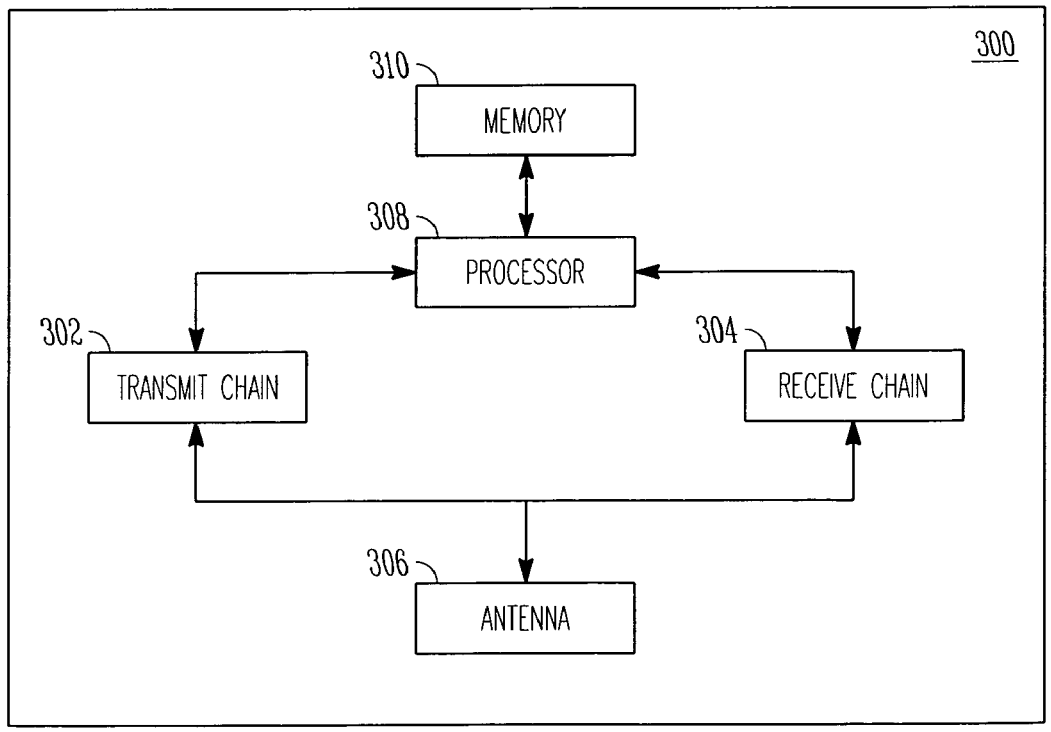
FIG. 3 is a simplified block diagram of a WLAN station, in accordance with an embodiment of the invention.

FIG. 3 is a simplified block diagram of a WLAN station 300 (e.g., station 102, 104, 106, 108, FIG. 1), in accordance with an embodiment of the invention. A WLAN station 300 supports station services. These services may include authentication, deauthentication, privacy, and delivery of data, for example.

In one embodiment, station 300 includes a transmit chain 302, a receive chain 304, an antenna 306, a processor 308, and memory 310. Memory 310 stores various types of data, and it can include RAM, ROM, numerous variations of those types of memories, and/or other types of storage. Processor 308 accesses information from memory 310. In addition, processor 308 sends information to and receives information from transmit chain 302 and receive chain 304.

As will be described in more detail later, transmit chain 302 includes a series of components, which receive data from processor 308 and prepare it for transmission over antenna 306. Receive chain 304 includes a series of components, which receive data from antenna 306 and prepare it for consumption or analysis by processor 308.

A WLAN station 300 may support an Institute of Electrical and Electronics Engineers (IEEE) 802.11 Standard (e.g., IEEE Std 802.11-1997, 802.11a, 802.11b, etc.), an IEEE 802.16 Standard, or another type of standard, in various embodiments. In addition, a WLAN station 300 may use any of a variety of multiple access techniques to communicate over an available communication channel. For example, a WLAN station 300 could support communications using FDMA, TDMA, and/or CDMA, in various embodiments.

Although only one transmit chain 302, receive chain 304, antenna 306, processor 308, and memory device 310 are shown in FIG. 1 for ease of illustration, more than one of any or all of these components could be included in a WLAN station 300, in various embodiments. For example, but not by way of limitation, a WLAN station 300 that supports multiple-in, multiple-out (MIMO) communications can include multiple transmit chains 302, and/or receive chains 304, and/or antennas 306. In addition, other components can be included in the station 300, which enable the station 300 to perform its intended functions.

Figure 4:
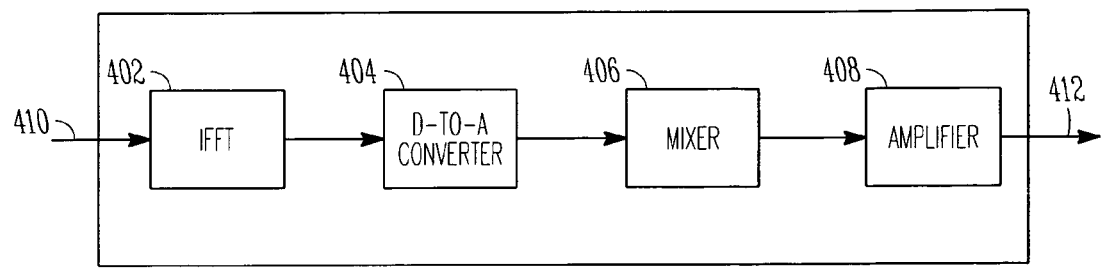
FIG. 4 is a diagram illustrating components included within a transmit chain, in accordance with an embodiment of the invention.

FIG. 4 is a diagram illustrating components included within a transmit chain 400, in accordance with an embodiment of the invention. Transmit chain 400 is illustrated in a simplified manner so that it can be applicable to an AP transmit chain or a station transmit chain. In practice, an AP transmit chain and a station transmit chain can have substantially different types of components.

In one embodiment, a transmit chain 400 includes an Inverse Fast Fourier Transform (IFFT) block 402, a digital-to-analog (D-to-A) converter 404, a mixer 406, and an amplifier 408. IFFT block 402 receives a digital stream 410 from a data source, such as a processor, for example. IFFT block 402 converts the digital stream 410 into a digital, frequency-domain signal. D-to-A converter 404 then converts the digital signal into an analog signal. The analog signal is upconverted from a baseband or intermediate frequency to a radio frequency by mixer 406. The signal is then amplified, by amplifier 408, and the resulting signal 412 is provided to an antenna to send over the air interface.

Figure 5:
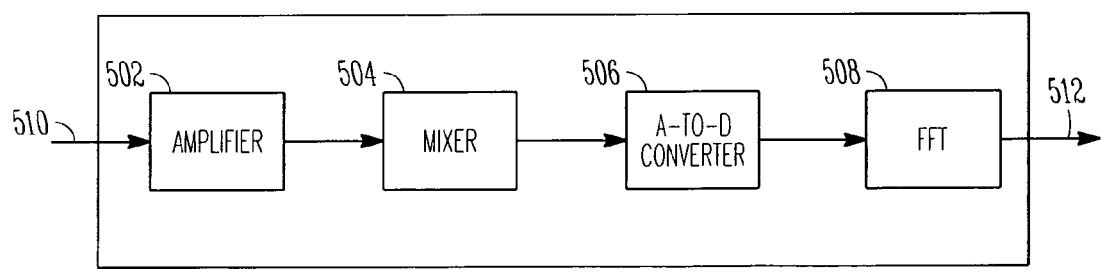
FIG. 5 is a diagram illustrating components included within a receive chain, in accordance with an embodiment of the invention.

FIG. 5 is a diagram illustrating components included within a receive chain 500, in accordance with an embodiment of the invention. As with the transmit chain illustrated in FIG. 4, receive chain 500 is illustrated in a simplified manner, so that it can be applicable to an AP receive chain or a station receive chain. In practice, an AP receive chain and a station receive chain can have substantially different types of components.

In one embodiment, a receive chain 500 includes an amplifier 502, a mixer 504, an analog-to-digital (A-to-D) converter 506, and an FFT block 508. Amplifier 502 is a low-noise amplifier, in one embodiment, which receives an analog, RF signal 510 from an antenna. Amplifier 502 amplifies the signal, and mixer 504 downconverts the signal to an intermediate frequency (or baseband). A-to-D converter 506 then converts the signal from an analog signal into a digital signal. The signal is then converted from the time domain to the frequency domain by FFT block 508. The resulting signal 512 is provided to a processor or other recipient.

Figure 6:
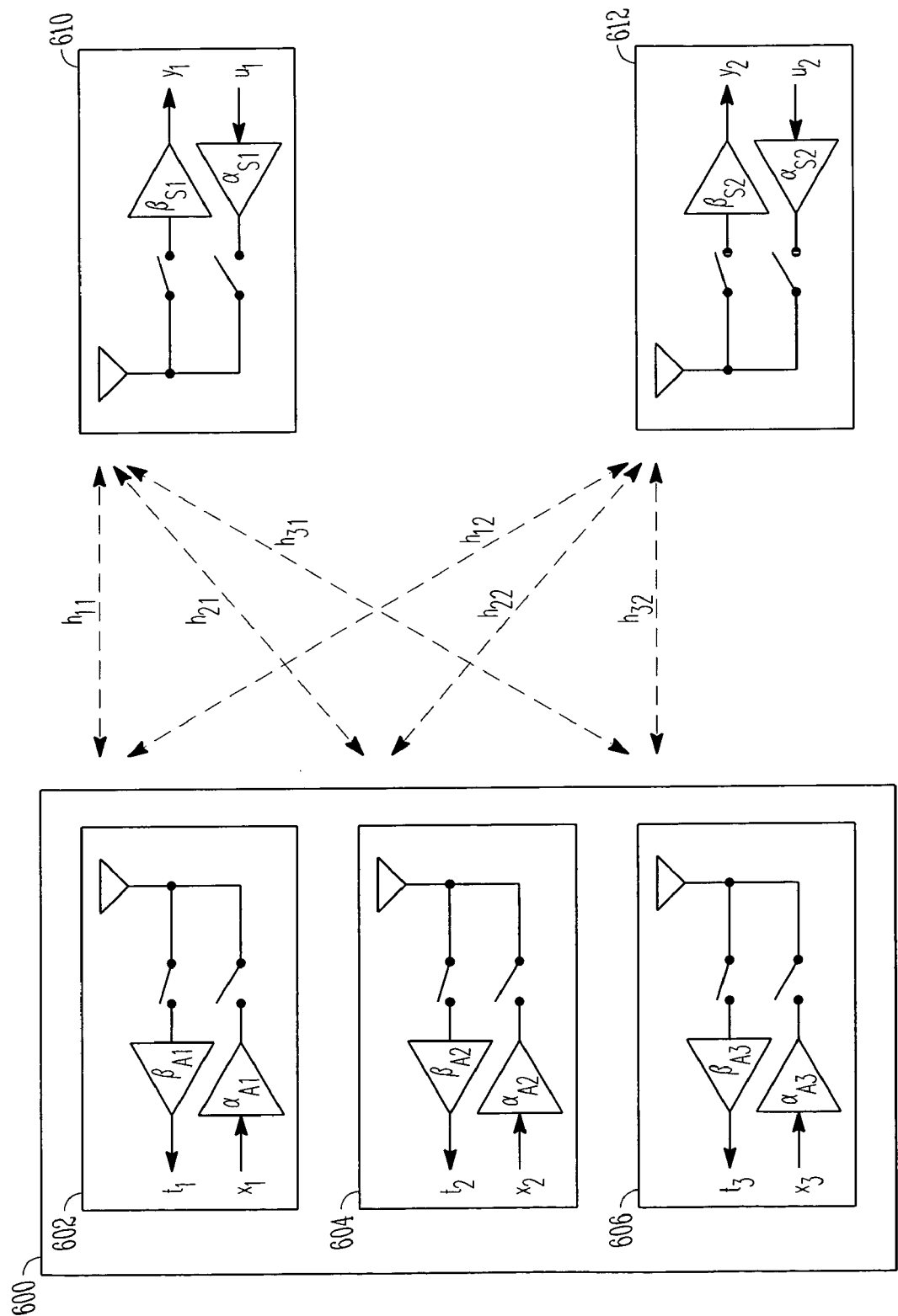
FIG. 6 is a diagram illustrating an example configuration of an SDMA system, in accordance with an embodiment of the invention.

FIG. 6 is a diagram illustrating an example configuration of an SDMA system, in accordance with an embodiment of the invention. The system includes one or more APs 600 with a plurality of antenna subsystems 602, 604, 606. In addition, the system includes a plurality of stations 610, 612. For ease of illustration and description, only the antenna subsystems of the AP and the stations are illustrated. It is to be understood that the AP and the stations include various other components to achieve their various functions.

FIG. 6 illustrates an AP 600 with three antenna subsystems 602, 604, 606. In other embodiments, an AP 600 could include more or fewer antenna subsystems 602, 604, 606. In addition, FIG. 6 illustrates only two stations 610, 612. As one of skill in the art would understand, the number of stations that communicate with a given AP 600 varies over time from as few as one station to numerous stations.

Each antenna subsystem 602, 604, 606 includes at least one transmit chain and at least one receive chain. The signal gain produced by the AP transmit chain is a complex number (i.e., a number having magnitude and phase), which is designated in FIG. 6 as $\alpha_{Ai}$, where i=1 to M, and M is the number of antennas associated with the AP 600 at a given time. In the illustrated example, M=3. The signal gain produced by the AP receive chain is a complex number designated as $\beta_{Ai}$.

Each station 610, 612 also includes at least one transmit chain and at least one receive chain. The signal gain produced by the station transmit chain is a complex number designated as $\alpha_{Sj}$, where j=1 to N, and N is the number of stations communicating over the network at a given time. The signal gain produced by the station receive chain is a complex number designated as $\beta_{Sj}$.

A signal that is sent through an antenna subsystem, over the air interface, and is received by a station, is subject to several stages of gain and/or phase change. For example, assume that signal $x_1$ is to be sent from AP 600 to station 610. First, signal $x_1$ is subject to gain, $\alpha_{A1}$, associated with the transmit chain of antenna subsystem 602. Then, the signal is subject to a loss and/or phase change, $h_{11}$, associated with the wireless channel. Next, the signal is subject to a gain, $\beta_{S1}$, associated with the receive chain of station 610. The resulting received signal $y_1$, at station 610.

Similarly, a signal that is sent through a station's transmit chain, over the air interface, and is received by an antenna subsystem of an AP, is also subject to several stages of gain and/or phase change. For example, assume that signal $u_2$ is to be sent from station 612 to antenna subsystem 606 of AP 600. First, signal $u_2$ is subject to gain, $\alpha_{S2}$, associated with the transmit chain of station 612. Then, the signal is subject to a loss and/or phase change, $h_{32}$, associated with the wireless channel. Next, the signal is subject to a gain, $\beta_{A3}$, associated with the receive chain of antenna subsystem 606. The resulting received signal is $t_3$, at antenna subsystem 606.

The channel characteristics, also referred to as the "channel state information," can be represented by a matrix that characterizes the gain and/or phase changes observed on each path. Each of these path variables is designated as $h_{ij}$, where i is the antenna subsystem identifier having a value i=1 to M (the number of antenna subsystems), and j is the station identifier, having a value j=1 to N (the number of stations). In the illustrated example, there are six antenna subsystem-to-station path combinations, designated as $h_{11}$, $h_{21}$, $h_{31}$, $h_{12}$, $h_{22}$, and $h_{32}$. Each of these variables is a complex number, in one embodiment, which indicates how much loss and/or phase change exists between a given antenna subsystem and a given station. Accordingly, each of these variables will likely have a different value, at any given time.

Signals received by a station on the downlink are subject to cross-talk. For example, if antenna subsystem 602 is transmitting a signal, $x_1$, to station 610, and antenna subsystem 604 simultaneously is transmitting a signal, $x_2$, to station 612, then the signals received by stations 610 and 612 will be super-positions of signals $x_1$ and $x_2$, unless some kind of pre-compensation for the cross-talk is made at the AP prior to transmission.

This pre-compensation is referred to as zero-forcing downlink beamforming. Using this technique, prior to sending out a stream intended for a particular station, the AP performs signal-mixing with the intended stream, of a signal that cancels the cross-talk from other, simultaneously-transmitted streams. When the signal-mixed stream is received at the station along with the cross-talk, the cross-talk is effectively cancelled, and the station receives only the intended stream.

Using prior-art techniques, zero-forcing downlink beamforming relies on measurements and/or calculations of a number of variables. These variables include: 1) the AP antenna subsystem transmit chain gains, $\alpha_{Ai}$; 2) the AP antenna subsystem receive chain gains, $\beta_{Ai}$; and 3) the channel characteristics, $h_{ij}$. If each of these variables are known, then zero-forcing downlink beamforming can be performed. However, if the third variable, $h_{ij}$, is not known, then these additional variables can be used to determine $h_{ij}$: 4) the station transmit chain gains, $\alpha_{Sj}$; and 5) the station receive chain gains, $\beta_{Sj}$.

If the station's transmit chain gain, $\alpha_{Sj}$, and receive chain gain, $\beta_{Sj}$, were identical for every station, then zero-forcing beamforming would be simplified significantly. However, $\alpha_{Sj}$ and $\beta_{Sj}$ are different for each station. This asymmetry between the downlink (AP-to-station) and uplink (station-to-AP) paths is one reason that prior art systems have implemented the closed-loop training procedure. As described previously, this closed loop procedure requires each station to send back information to the AP, which indicates the station transmit and receive chain gains. In addition, using prior art training procedures, the training procedure is repeated frequently, in order to maintain an acceptable level of accuracy in light of the rapidly-changing channel conditions.

According to embodiments of the invention, a "primary condition" is derived and implemented, which enables zero-forcing downlink beamforming to be achieved without the use of the prior art's frequent, closed-loop training procedures. This primary condition is that the ratio of each antenna subsystem's transmit chain gain, $\alpha_{Ai}$, to its receive chain gain, $\beta_{Ai}$, is equal to the same ratio for the other antenna subsystems. For example, in an AP that includes three antenna subsystems, the primary condition is expressed according to Equation 1, below:

$$\frac{\alpha_{A1}}{\beta_{A1}} = \frac{\alpha_{A2}}{\beta_{A2}} = \frac{\alpha_{A3}}{\beta_{A3}} = c_n \quad (1)$$

where $c_n$ is a constant for the n-th subcarrier, during a particular calibration process. The constant $c_n$ may be different for different sub-carriers. In an alternate embodiment, the primary condition could be that the inverse ratios of those ratios given in Equation 1 are equal (i.e., the ratio of the receive chain gains to the transmit chain gains are equal).

Using internal calibration procedures described later, each AP antenna subsystem's transmit chain gain and/or receive chain gain are occasionally calibrated (i.e., adjusted) to satisfy this primary condition. The amounts of gain adjustment are determined through a procedure of transmitting calibration signals between antenna subsystems, measuring the antenna subsystems' transmit and receive chain gains, and adjusting these gains to satisfy the primary condition given in Equation 1. The internal calibration procedures will be described in detail later. Before that description, a description of the derivation of the primary condition given in Equation 1 is given in the next few paragraphs, below.

Using prior-art techniques, the channel state information (CSI) is important for implementing SDMA. The CSI is acquired through a closed-loop training procedure, as previously described. During this training procedure, multiple stations send signals to an AP, in turn. The measurements obtained at AP are not the responses of the wireless channel. Instead, each signal includes the combined responses of the transmit chain of the transmitting station, the wireless channel, and the receive chain of the AP's antenna subsystem. In the SDMA downlink, the beamforming matrix is affected by the combined responses of the transmit chain of the AP's transmitting antenna subsystem, the wireless channel, and the receive chain of the stations. Furthermore, the transmit and receive chain gains of the stations are not available to the AP.

Based on the signals transmitted to the AP, the AP can estimate the aggregate channel matrix from the input of the stations' transmit chains to the output of the AP's receive chains for the n-th subcarrier according to Equation 2, as follows:

$$H_u = \begin{bmatrix} \beta_{A1} & 0 & 0 \\ 0 & \beta_{A2} & 0 \\ 0 & 0 & \beta_{A3} \end{bmatrix} \begin{bmatrix} h_{11} & h_{12} \\ h_{21} & h_{22} \\ h_{31} & h_{32} \end{bmatrix} \begin{bmatrix} \alpha_{S1} & 0 \\ 0 & \alpha_{S2} \end{bmatrix} \quad (2)$$

where $\beta_{A1}$, $\beta_{A2}$ and $\beta_{A3}$ are the responses of the AP's receive chains 1, 2 and 3 respectively; H, the middle matrix, is the wireless channel matrix for the uplink; and $\alpha_{S1}$ and $\alpha_{S2}$ are the responses of the transmit chains for stations 1 and 2, respectively. The subcarrier index, n, is omitted, for simplicity. H is not observed by the AP, and it hides in $H_u$. $H_u$ represents the measurements of the training signals.

For an SDMA uplink, the matrix $H_u$ can be directly used in beamforming, without further processing. However, the matrix cannot be applied to downlink computation directly. The reason is that the downlink is affected by the AP's transmit chains and the stations' receive chains, which are not captured by $H_u$. Prior-art techniques require the wireless channel matrix H to achieve zero-forcing downlink beamforming. Accordingly, these techniques require feedback from the stations to estimate H. The AP receives the transmit chain gains from each of the stations, and the AP uses this information to estimate H from $H_u$. We devise a simple scheme that performs zero-forcing beamforming, which employs $H_u$ directly observed from the training.

In accordance with various embodiments, the AP's transmit and receive chains are calibrated and compensated such that, for each sub-carrier, the ratios of the transmit gain to the corresponding receive gain are constant for all AP's antenna subsystems. Accordingly, the pseudo-inversion of $H_u$ can be directly used as the zero-forcing beamforming matrix. The derivation is included below.

The received signals at the stations from a zero-forcing AP in the downlink is given by Equation 3 as follows:

$$\begin{bmatrix} y_1 \\ y_2 \end{bmatrix} = \begin{bmatrix} \beta_{S1} & 0 \\ 0 & \beta_{S2} \end{bmatrix} H^T \begin{bmatrix} \alpha_{A1} & 0 & 0 \\ 0 & \alpha_{A2} & 0 \\ 0 & 0 & \alpha_{A3} \end{bmatrix} W \begin{bmatrix} d_1 \\ d_2 \end{bmatrix} \quad (3)$$

where $y_1$ and $y_2$ are the received signal at the output of the stations' receive chains; $d_1$ and $d_2$ are the data signals sent to the stations; W is the zero-forcing beamforming matrix; $\alpha_{A1}$, $\alpha_{A2}$ and $\alpha_{A3}$ are the transmit chain gains of the three AP's transmit chains; and $\beta_{S1}$ and $\beta_{S2}$ are the receive chain gains of the stations' receive chains. $H^T$ is the wireless channel matrix for the downlink. If W is substituted with the pseudo-inversion of $H_u^T$, the previous expression can be written as Equation 4:

$$\begin{bmatrix} y_1 \\ y_2 \end{bmatrix} = \begin{bmatrix} \beta_{S1} & 0 \\ 0 & \beta_{S2} \end{bmatrix} H^T \begin{bmatrix} \alpha_{A1} & 0 & 0 \\ 0 & \alpha_{A2} & 0 \\ 0 & 0 & \alpha_{A3} \end{bmatrix} \begin{bmatrix} \beta_{A1}^{-1} & 0 & 0 \\ 0 & \beta_{A2}^{-1} & 0 \\ 0 & 0 & \beta_{A3}^{-1} \end{bmatrix} \quad (4)$$

$$(H^T)^{\triangledown} \begin{bmatrix} \alpha_{S1}^{-1} & 0 \\ 0 & \alpha_{S2}^{-1} \end{bmatrix} \begin{bmatrix} d_1 \\ d_2 \end{bmatrix}$$

where "$T$" is the transpose operator, $(H^T)^{\triangledown}$ is the pseudo-inversion of $H^T$. Mathematically, $H^T (H^T)^{\triangledown} = I$ (an identity matrix) if $H^T$ is full row rank. If $y_1$ does not contain interference from $d_2$, (e.g., when the AP performs zero-forcing beamforming), a sufficient condition is that the product of the two matrices in the middle (i.e., the $\alpha_{Ai}$ and $\beta_{Ai}$ matrices) is a scaled identity matrix. Accordingly, the primary condition can be written as Equation 1, above.

To satisfy the primary condition, calibration and compensation can be performed at the AP only. Several embodiments of methods to calibrate and compensate the antenna subsystems of the AP are described below.

Figure 7:
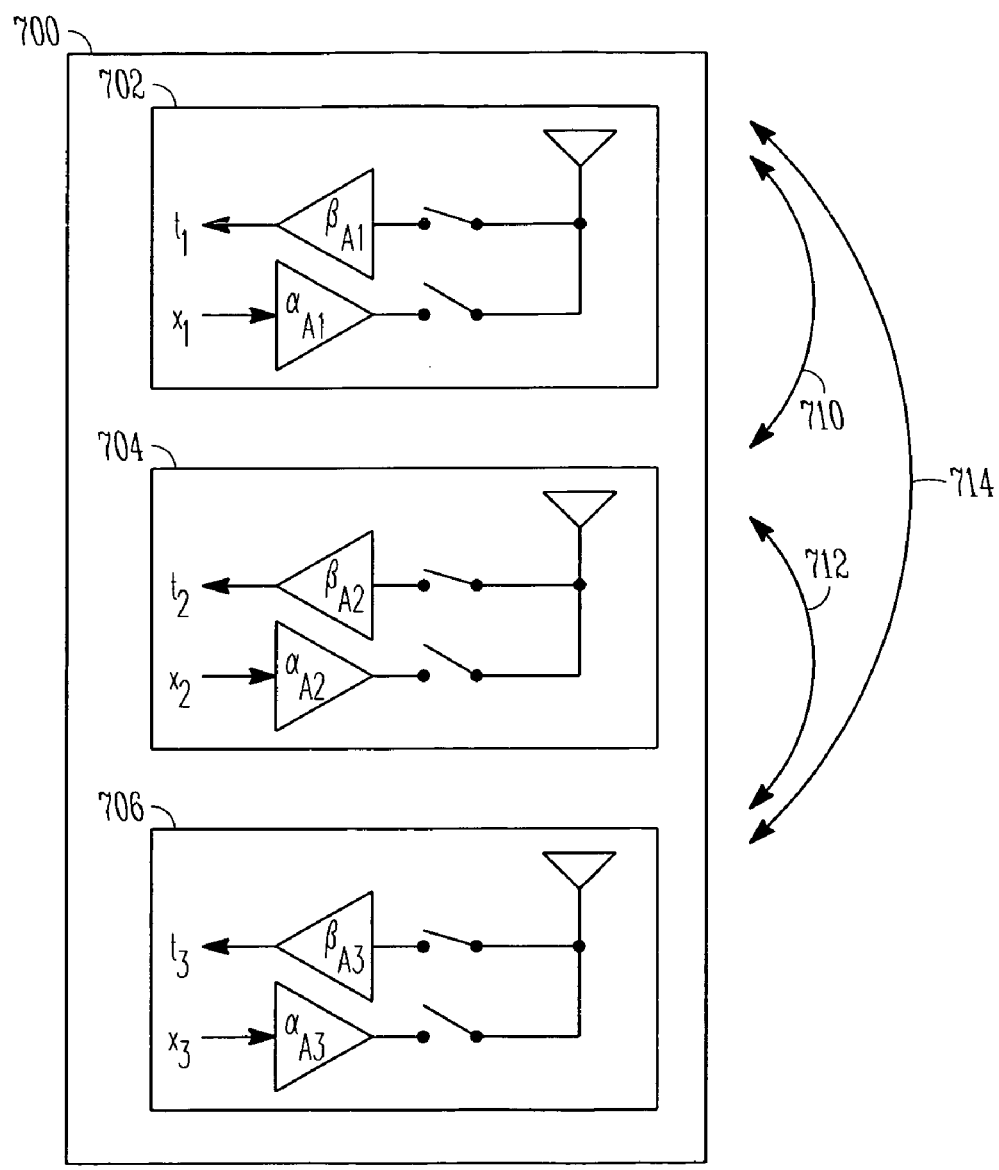
FIG. 7 is a diagram illustrating signals transmitted between AP antenna subsystems, in accordance with an embodiment of the invention.

FIG. 7 is a diagram illustrating signals transmitted between AP antenna subsystems 702, 704, 706, in accordance with an embodiment of the invention. As will be described in more detail in conjunction with FIGS. 7, 8, and 12, internal calibration processes are performed in conjunction with various embodiments of the invention. In accordance with several embodiments, a number of subsystem-to-subsystem signals, referred to herein as "calibration signals," are exchanged over wireless channels 710, 712, 714 between antenna subsystems 702, 704, 706 of an AP 700, which may be the same as or different from AP 200 in FIG. 2. The outputs of the various AP receive chains are measured, and the gains of some or all of the AP transmit chains and/or receive chains are adjusted to satisfy the primary condition given in Equation 1.

FIG. 7 illustrates three channels 710, 712, 714 between antenna subsystems 702, 704, 706. Antenna subsystem 702 transmits calibration signals to antenna subsystem 704, and vice versa, over channel 710. Antenna subsystem 704 transmits calibration signals to antenna subsystem 706, and vice versa, over channel 712. Finally, antenna subsystem 702 transmits calibration signals to antenna subsystem 706, and vice versa, over channel 714.

Each channel 710, 712, 714 has a response characteristic, $C_{xy}$, where x indicates the identity of the transmitting antenna subsystem, and y indicates the identity of the receiving antenna subsystem. Because each antenna subsystem can transmit or receive calibration signals, then the number of channel response characteristics equals 2×M, where M is the number of antenna subsystems in the AP. Accordingly, in the illustrated example, 2×3=6 channel response characteristics exist. FIG. 7 illustrates three antenna subsystems 702, 704, 706. In other embodiments, more or fewer antenna subsystems could be included in an AP 700.

Figure 8:
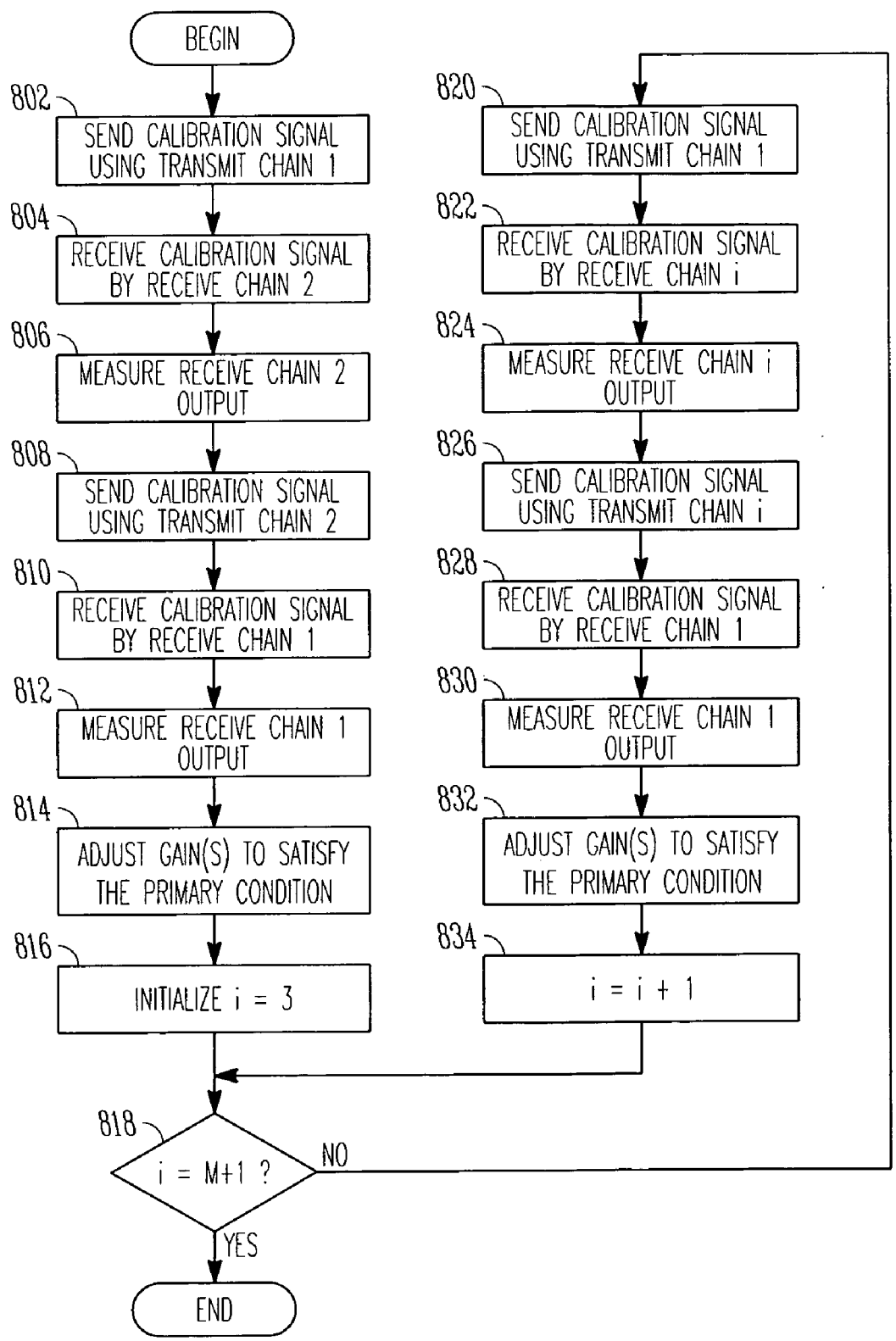
FIG. 8 is a flowchart of a procedure for calibrating an AP, in accordance with an embodiment of the invention.

FIG. 8 is a flowchart of a procedure for calibrating an AP, in accordance with an embodiment of the invention. This calibration procedure results in the calibration and compensation of the M transmit chains and the M receive chains at the AP to satisfy the primary condition given in Equation 1.

For purposes of description, the terms "transmit chain 1" and "receive chain 1" indicate transmit and receive chains associated with "antenna subsystem 1" (e.g., subsystem 702, FIG. 7). Similarly, the terms "transmit chain 2" and "receive chain 2" indicate transmit and receive chains associated with "antenna subsystem 2" (e.g., subsystem 704), and so on. The description of the flowchart of FIG. 8 indicates that calibration signals are sent and measured in a sequence. It would be obvious to one of skill in the art, based on the description herein, that the sequence could be modified from the example sequence described, while achieving the same result. In addition, any antenna subsystem can be designated as "antenna subsystem 1."

The method begins, in block 802, by the AP sending a calibration signal, $x_0$, for the n-th sub-carrier, using transmit chain 1 (e.g., the transmit chain associated with subsystem 702, FIG. 7). In block 804, the calibration signal is received by receive chain 2 (e.g., the receive chain associated with subsystem 704).

In block 806, the output of receive chain 2 is measured. The measured output is given by $t_{12}=\alpha_{A1} C_{12} \beta_{A2} x_0$, where $C_{12}$ is the channel response between the input of antenna subsystem 1 to the output of antenna subsystem 2.

In block 808, the AP sends a calibration signal, $x_0$, for the n-th sub-carrier, using transmit chain 2 (e.g., the transmit chain associated with subsystem 704, FIG. 7). In block 810, the calibration signal is received by receive chain 1 (e.g., the receive chain associated with subsystem 702).

In block 812, the output of receive chain 1 is measured. The measured output is given by $t_{21}=\alpha_{A2} C_{21} \beta_{A1} x_0$, where $C_{21}$ is the response from the input of antenna subsystem 2 to the output of antenna subsystem 1.

In block 814, one or more of the gains, $\alpha_{A1}$, $\beta_{A1}$, $\alpha_{A2}$, $\beta_{A2}$, are adjusted to approximately equate $t_{12}$ and $t_{21}$. In one embodiment, only one gain (e.g., $\beta_{A2}$) is adjusted. Gain adjustment is made in the digital domain, in one embodiment. For example, the gains of $\alpha_{A1}$ and/or $\alpha_{A2}$ can be made within or before the D-to-A converter (e.g., converter 404, FIG. 4). Alternatively or in addition, the gains of $\beta_{A1}$ and/or $\beta_{A2}$ can be made within or after the A-to-D converter (e.g., converter 506, FIG. 5). In other embodiments, gain adjustment is made in the analog domain.

After the adjustment or compensation, $t_{12}=t_{21}$ yields Equation 5 as follows:

$$\alpha_{A1}C_{12}\beta_{A2}x_0=\alpha_{A2}C_{21}\beta_{A1}x_0 \quad (5)$$

Due to reciprocity, $C_{12}=C_{21}$. Accordingly, Equation 5 can be simplified into Equation 6, as follows:

$$\frac{\alpha_{A1}}{\beta_{A1}} = \frac{\alpha_{A2}}{\beta_{A2}} \quad (6)$$

If any antenna subsystems have yet to be adjusted or compensated, then a loop is entered to achieve that purpose. The loop iterates for i=3, . . . , M, where M equals the number of antenna subsystems within the AP. Accordingly, in block 816, a loop variable i is initialized to a value of 3. In block 818, a determination is made whether i=M+1. If so, then the procedure ends. If not, then block 820 is performed.

In block 820, the AP again sends a calibration signal, $x_0$, for the n-th sub-carrier, using transmit chain 1. In block 822, the calibration signal is received by receive chain i.

In block 824, the output of receive chain i is measured. The measured output is given by $t_{1i}=\alpha_{A1}C_{1i}\beta_{Ai}x_0$, where $C_{1i}$ is the channel response between the input of antenna subsystem 1 to the output of antenna subsystem i.

In block 826, the AP sends a calibration signal, $x_0$, for the n-th sub-carrier, using transmit chain i. In block 828, the calibration signal is received by receive chain 1.

In block 830, the output of receive chain 1 is measured. The measured output is given by $t_{i1}=\alpha_{Ai}C_{i1}\beta_{A1}x_0$, where $C_{i1}$ is the response from the input of antenna subsystem i to the output of antenna subsystem 1.

In block 832, one or more of the gains, $\alpha_{Ai}$, $\beta_{Ai}$, are adjusted to approximately equate $t_{1i}$ and $t_{i1}$. In one embodiment, only one gain (e.g., $\beta_{Ai}$) is adjusted. As described previously, gain adjustment can be made in the digital or analog domains. After the adjustment or compensation, $t_{1i}=t_{i1}$ yields Equation 7 as follows:

$$\alpha_{A1}C_{1i}\beta_{Ai}x_0=\alpha_{Ai}C_{i1}\beta_{A1}x_0 \quad (7)$$

Due to reciprocity, $C_{1i}=C_{i1}$. Accordingly, Equation 7 can be simplified into Equation 8, as follows:

$$\frac{\alpha_{A1}}{\beta_{A1}} = \frac{\alpha_{Ai}}{\beta_{Ai}} \quad (8)$$

In block 834, the loop variable i is incremented by 1, and the procedure iterates.

The embodiment illustrated in FIG. 8 performs calibration for a number of chain combinations equal to M−1. For example, for an AP having three antenna subsystems, where M=3, the number of chain combinations for which a calibration procedure is performed equals 2. In another embodiment, more than M−1 chain combinations are evaluated.

FIG. 8 illustrates an embodiment where transmit chain 1 sequentially sends a calibration signal M−1 times to the M−1 receive chains. In an alternate embodiment, transmit chain 1 can send a calibration signal that is received simultaneously by more than one receive chain at a time. In such an embodiment, transmit chain 1 can send only one calibration signal, or a number of signals that is less than M−1. This embodiment can be implemented in an AP that includes multiple A-to-D converters (e.g., converter 506, FIG. 5), such as an A-to-D converter for each receive chain.

In embodiments where the calibration is performed sequentially, the calibrations for each of chains 3, 4, . . . , M can use chain 2 (or another earlier chain) as a reference. In other words, the calibration for these chains does not necessarily have to use chain 1 as a reference. However, using earlier chains (other than chain 1) as references may have consequences in terms of error accumulation.

Figure 9:
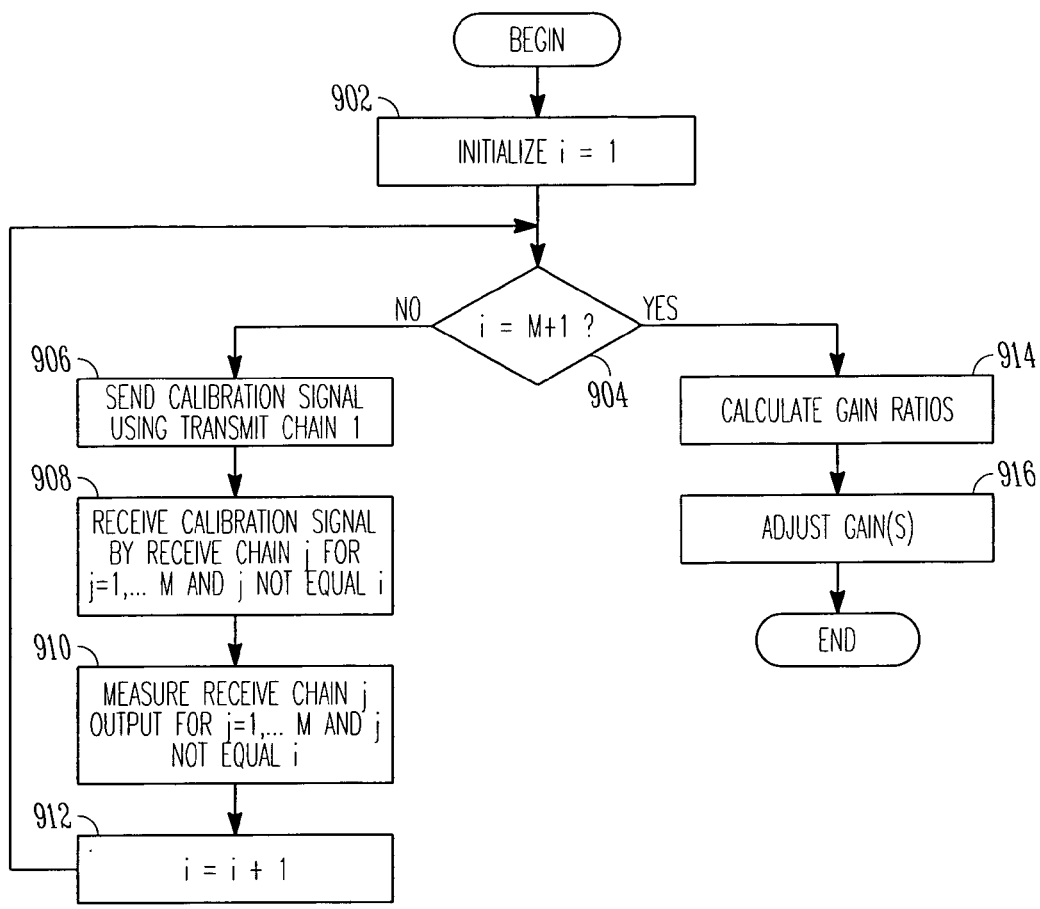
FIG. 9 is a flowchart of a procedure for calibrating an AP, in accordance with another embodiment of the invention.

FIG. 9 is a flowchart of a procedure for calibrating an AP, in accordance with another embodiment of the invention. In this embodiment, all of the various chain combinations are evaluated. Evaluation is performed using a loop structure, in one embodiment. The loop iterates for i=1, . . . , M, where M equals the number of antenna subsystems within the AP. In this embodiment, the method begins, in block 902, by initializing loop variable i to a value of 1.

In block 904, a determination is made whether i=M+1. If so, the method proceeds to block 914, which is described later. If not, then block 906 is performed, within which the AP sends a calibration signal, $x_0$, for the n-th sub-carrier, using transmit chain i.

In block 908, the calibration signal is received by each of the receive chains j, for j=1, . . . , M, and j≠i (since i indicates the transmitting chain). In block 910, the output of each of the receive chains j is measured, for j=1, . . . , M, and j≠i. The measured output is given by $t_{ij}=\alpha_{Ai}C_{ij}\beta_{Aj}x_0+n_{ij}$, where $C_{ij}$ is the channel response between the input of antenna subsystem i to the output of antenna subsystem j, and $n_{ij}$ is independent identically distributed (i.i.d.) Gaussian noise in the measurement chain.

In block 912, the loop variable i is then incremented by 1, and the procedure returns to block 904. Completion of the loop iterations results in M(M−1) measurements of $t_{ij}$, i,j= 1, . . . , M. Upon completion of the inner and outer loops, then block 914 is performed.

In block 914, M(M−1)/2 gain ratios are calculated. In one embodiment, the gain ratios are calculated according to Equations 9–14, as follows:

$$\begin{aligned}\frac{t_{ij}}{t_{ji}} &= \frac{\alpha_{Ai}\beta_{Aj}C_{ij}x_0+n_{ij}}{\alpha_{Aj}\beta_{Ai}C_{ji}x_0+n_{ji}} \quad (9)\\
&= \frac{\alpha_{Ai}\beta_{Aj}C_{ij}x_0}{\alpha_{Aj}\beta_{Ai}C_{ji}x_0}\left[1+\left(\frac{\alpha_{Aj}\beta_{Ai}C_{ji}x_0}{\alpha_{Aj}\beta_{Ai}C_{ji}x_0}\cdot\frac{\alpha_{Ai}\beta_{Aj}C_{ij}x_0+n_{ij}}{\alpha_{Aj}\beta_{Ai}C_{ji}x_0+n_{ji}}-1\right)\right]\\
&= \frac{\alpha_{Ai}\beta_{Aj}C_{ij}x_0}{\alpha_{Aj}\beta_{Ai}C_{ji}x_0}\left[1+\left(\frac{\alpha_{Aj}\beta_{Ai}C_{ji}x_0n_{ij}-\alpha_{Ai}\beta_{Aj}C_{ij}x_0n_{ji}}{\alpha_{Ai}\beta_{Aj}C_{ij}x_0(\alpha_{Aj}\beta_{Ai}C_{ji}x_0+n_{ji})}\right)\right]\\
&\cong \frac{\alpha_{Ai}\beta_{Aj}C_{ij}x_0}{\alpha_{Aj}\beta_{Ai}C_{ji}x_0}\left[1+\left(\frac{n_{ij}}{t_{ij}}-\frac{n_{ji}}{t_{ji}}\right)\right]\\
&= \frac{r_i}{r_j}\left[1+\left(\frac{n_{ij}}{t_{ij}}-\frac{n_{ji}}{t_{ji}}\right)\right]\end{aligned}$$

where $r_i$ is defined as $$\frac{\alpha_{Ai}}{\beta_{Ai}}.$$

Taking a log on both sides of Equation 9 yields the following:

$$\log t_{ij} - \log t_{ji} = \log r_i - \log r_j + \log\left[1 + \left(\frac{n_{ij}}{t_{ij}} - \frac{n_{ji}}{t_{ji}}\right)\right] \quad (10)$$

$$\cong \log r_i - \log r_j + \left(\frac{n_{ij}}{t_{ij}} - \frac{n_{ji}}{t_{ji}}\right)$$

Equation 10 can be rewritten by defining some new variables as follows:

$$T_{ij} \cong R_i - R_j + \left(\frac{1}{\|t_{ij}\|^2} + \frac{1}{\|t_{ji}\|^2}\right)^{\frac{1}{2}} n_{ij} \text{ or } b_{ij}T_{ij} \cong \quad (11)$$

$$b_{ij}R_i - b_{ij}R_j + n_{ij}, \quad \text{for } i, j = 1, \ldots, M, i < j$$

where $n_{ij}$ is i.i.d. Gaussian noise; $T_{ij}$ is defined as $\log t_{ij} - \log t_{ji}$; $R_1$ is defined as log $$\frac{\alpha_{AI}}{\beta_{AI}};$$

and $b_{ij}$ is defined as $$\left(\frac{1}{\|t_{ij}\|^2} + \frac{1}{\|t_{ji}\|^2}\right)^{-1/2}.$$

Equation 11 can be written in matrix format as follows:

$$\begin{bmatrix} b_{12}T_{12} \\ b_{13}T_{13} \\ \vdots \\ b_{(M-1)M}T_{(M-1)M} \end{bmatrix} = \begin{bmatrix} b_{12} & -b_{21} & 0 & \ldots \\ b_{13} & 0 & -b_{31} & \ldots \\ \vdots & \vdots & \vdots & \vdots \\ 0 & \ldots & \ldots & -b_{(M-1)M} \end{bmatrix} \begin{bmatrix} R_1 \\ R_2 \\ \vdots \\ R_M \end{bmatrix} + \begin{bmatrix} n_{12} \\ n_{13} \\ \vdots \\ n_{(M-1)M} \end{bmatrix} \quad (12)$$

M(M−1)/2 linear equations exist within Equation 12, along with M unknown variables, $R_i$, to solve. Because Matrix A has a column rank of M−1, $R_i$'s are not uniquely determined. It is easy to check that if we add a constant to a set of solutions, a new set of solutions is obtained. By setting $R_1$=0, Equation 12 becomes:

$$\underbrace{\begin{bmatrix} b_{12}T_{12} \\ b_{13}T_{13} \\ \vdots \\ b_{(M-1)M}T_{(M-1)M} \end{bmatrix}}_{b} = \underbrace{\begin{bmatrix} -b_{21} & 0 & \ldots & 0 \\ 0 & -b_{31} & \ldots & 0 \\ \vdots & \vdots & \vdots & \vdots \\ 0 & \ldots & b_{M(M-1)} & -b_{(M-1)M} \end{bmatrix}}_{A} \underbrace{\begin{bmatrix} R_1 \\ R_2 \\ \vdots \\ R_M \end{bmatrix}}_{r} + \underbrace{\begin{bmatrix} n_{12} \\ n_{13} \\ \vdots \\ n_{(M-1)M} \end{bmatrix}}_{n} \quad (13)$$

where $b_{ji} = b_{ij}$.

The minimum mean square error (MMSE) solutions of the unknowns are found according to Equation 14 as:

$$r = \left(A^H A + \frac{1}{N_0}I\right)^{-1} A^H b \quad (14)$$

where $N_0$ is the variance of $n_{ij}$. This solution given in Equation 14 is valid for the case when the variances are approximately equal for all is and js. The expression is slightly different if the variances are not equal.

In block 916, one or more transmit and/or receive chain gains are adjusted. By adjusting $\alpha_i, \beta_i$, i=2, . . . , M, the $R_j$s are forced to be the same, and therefore the primary condition of Equation 1 is satisfied. The method then ends.

One of skill in the art would recognize, based on the description herein, that there are other ways to find the ratios $r_i$ after observing the measurements in block 910. The MMSE solution of Equation 13 has low complexity and good performance. Other solutions may exist, which also have low complexity and good performance.

In the embodiments described in conjunction with FIGS. 8 and 9, various antenna couplings are used, and the reciprocity of wireless channels is assumed. However, ambient noise in the wireless channels may affect the various signal measurements, and thus affect the calibrations.

In an alternate embodiment, a channel simulator is employed in the AP between the various antenna subsystems, in order to mitigate the noise. For example, in one embodiment, the channel simulator can include a bank of switches and an attenuator.

Figure 10:
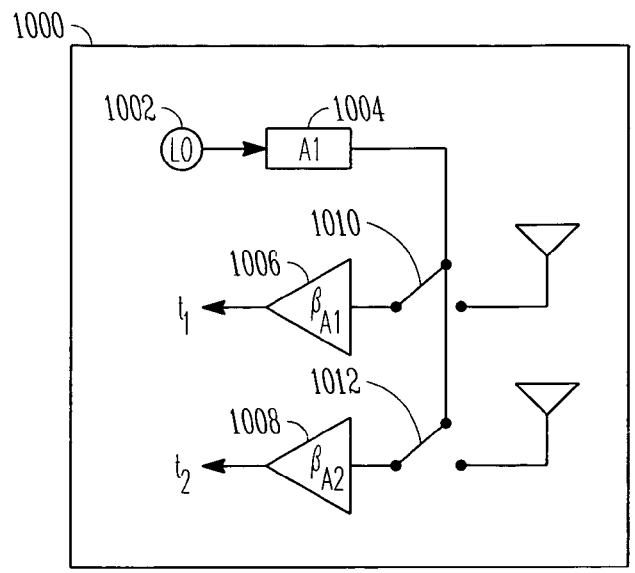
FIG. 10 is a diagram illustrating a first state of a system configuration that uses a channel simulator, in accordance with an embodiment of the invention.

FIG. 10 is a diagram illustrating a first state of a system configuration that uses a channel simulator, in accordance with an embodiment of the invention. In one embodiment, the AP 1000 provides a signal from a signal source 1002, such as a local oscillator, for example. An attenuator 1004 coupled to the signal source 1002 attenuates the signal, which emulates the attenuation that may be experienced by transmitting the signal over the air interface. The attenuated signal is provided to the receive chains 1006, 1008 of two or more antenna subsystems by closing switches 1010, 1012.

The resulting output signals of the receive chains are indicated by $t_1$ and $t_2$. These signals are measured, to determine an estimate of the receive chains' gain characteristics. In order to determine estimates of the transmit chains' gain characteristics, the AP is switched to a second state.

Figure 11:
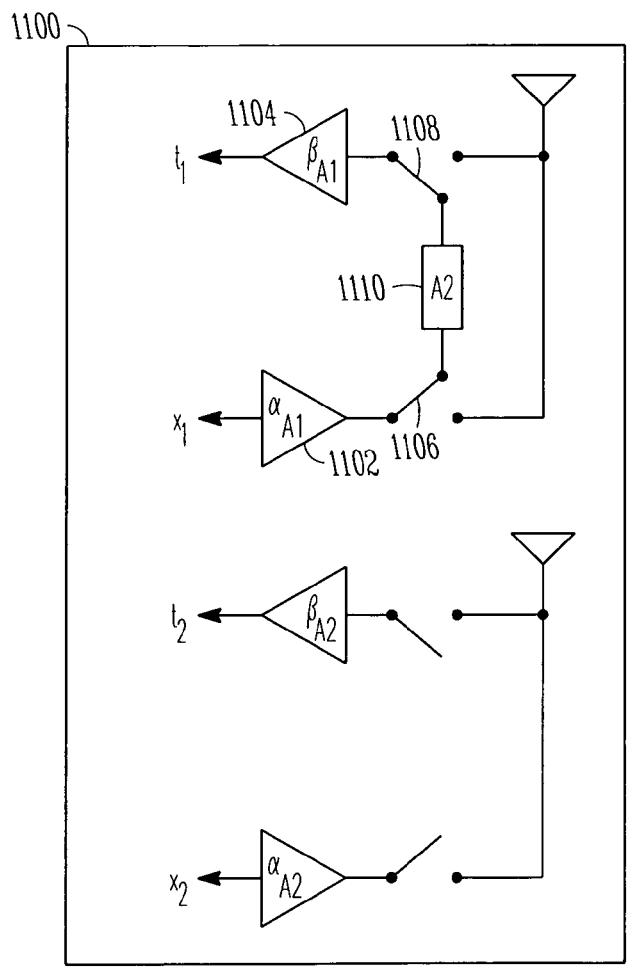
FIG. 11 is a diagram illustrating a second state of the system configuration illustrated in FIG. 10.

FIG. 11 is a diagram illustrating a second state of the system configuration illustrated in FIG. 10. In this configuration, the transmit chain 1102 and the receive chain 1104 of a first antenna subsystem are interconnected through switches 1106, 1108 and a second attenuator 1110. The AP 1100 provides a signal, $x_1$, through the transmit chain 1102, attenuator 1110, and receive chain 1104. From the measured signal, $t_1$, the transmit chain gain, can be calculated. This process is then repeated for the other antenna subsystems.

Figure 12:
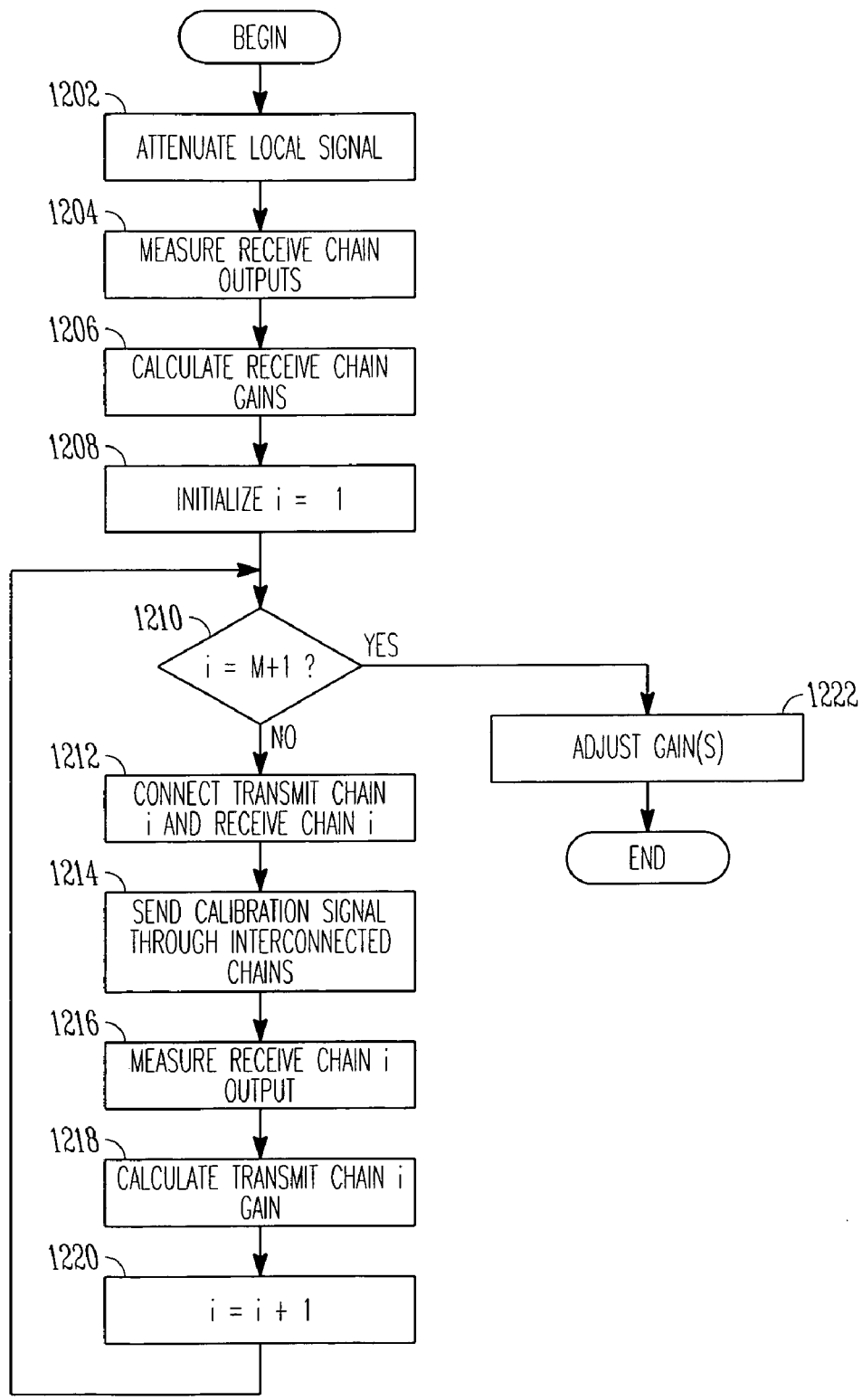
FIG. 12 is a flowchart of a procedure for calibrating an AP, in accordance with another embodiment of the invention.

FIG. 12 is a flowchart of a procedure for calibrating an AP, in accordance with another embodiment of the invention. The method can be implemented, for example, using system configurations such as those illustrated in FIGS. 10 and 11.

The method begins, in block 1202, by the AP attenuating a signal, $x_0$, from a signal source (e.g., a local oscillator), and sending the attenuated signal to each of the AP's receive chains. In one embodiment, the attenuated signal is sent to the receive chains through manipulation of switching mechanisms (e.g., switches 1010, 1012, FIG. 10).

In block 1204, the outputs of the receive chains are measured as $t_i = A_1 \beta_{Ai} x_0$, for $i = 1, \ldots, M$ (the number of antenna subsystems), where $A_1$ is the attenuation of the attenuator (e.g., attenuator 1004, FIG. 10), and $\beta_{Ai}$ is the gain of the i-th receive chain. In block 1206, $\beta_{Ai}$ is calculated, for $i = 1, \ldots, M$, from the measured receive chain outputs, $t_i$.

In block 1208, a loop variable i is initialized to a value of 1. A determination is then made, in block 1210, whether $i = M+1$. If so, the method proceeds to block 1222, which is described in detail later. If not, then block 1212 is performed.

In block 1212, the AP then connects the transmit and receive chains of the i-th antenna subsystem, as shown in FIG. 11 for $i = 1$. In one embodiment, the transmit and receive chains are connected through second switching mechanisms (e.g., switches 1106, 1108, FIG. 11) and a second attenuator (e.g., attenuator 1110).

In block 1214, the AP sends a signal, $x_i$, through the interconnected transmit chain and receive chain for the i-th antenna subsystem. In block 1216, the output of the i-th receive chain is measured as $t_i = A_2 \alpha_{Ai} \beta_{Ai} x_i$, where $A_2$ is the attenuation of the attenuator (e.g., attenuator 1110, FIG. 11), $\alpha_{Ai}$ is the gain of the i-th transmit chain, and $\beta_{Ai}$ is the gain of the i-th receive chain, which was calculated in block 1206. In block 1218, $\alpha_{Ai}$ is calculated from the measured receive chain output, $t_i$.

In block 1220, the loop variable i is incremented by 1, and the procedure iterates until the transmit chain gains have been calculated for each antenna subsystem.

When all transmit chain gains have been calculated, the differences in the ratios of Equation 1 are compensated, in block 1222, by adjusting one or more transmit and/or receive chain gains, as described previously in conjunction with the descriptions of other embodiments. The method then ends.

The internal calibration procedures described in conjunction with the various embodiments can be performed, without a loss in performance, with much less frequency than the closed-loop training procedures of the prior art. The reason is that the changing channel conditions between the AP and the stations do not affect the accuracy of the calibrations. Instead, the accuracy of the calibrations is affected by slower-moving variables, such as the internal temperature of the AP, for example. Accordingly, the calibration procedures of the various embodiments can be performed once every 10–30 minutes, in one embodiment. In other embodiments, the calibration procedures can be performed more or less frequently than the above range.

Thus, various embodiments of methods and apparatus for calibrating an AP to support zero-forcing beamforming on the downlink of an SDMA system have been described. The inventive subject matter can be implemented in a number of different types of systems in various embodiments, including WLAN systems, other wireless networks, terrestrial cellular telephone, satellite cellular telephone, radio systems, paging systems, and other types of systems. Other embodiments will be readily apparent to those of ordinary skill in the art. For example, but not by way of limitation, the various embodiments can be implemented in systems that use an IEEE 802.11 Standard, an IEEE 802.16 Standard, and/or other WLAN, cellular telephone, radio, paging or other standards.

SDMA, when implemented in a WLAN system in accordance with various embodiments, enables an increase in network throughput of the system, where the throughput can be multiplied by approximately the number of antennas at the AP, without the need for increased spectrum usage. Furthermore, SDMA can be applied to WLAN systems that use prevalent 802.11 standards, without the need to replace the stations with stations that are required to support the closed-loop training procedures of the prior art. This is because the embodiments of the present invention enable an AP to achieve zero-forcing beamforming without channel station state information.

The inventive subject matter is not to be construed as limited to any particular architecture or combination of functional elements or ICs. Its use is extremely flexible, being readily adaptable to any electronic system in which its advantages are desired to be achieved. The systems depicted in the Figures are merely examples of electronic systems in which the inventive subject matter can be used.

Many variations of the various circuits appearing in the drawings will be apparent to those skilled in the art having the benefit of this disclosure. For example, the various circuits disclosed herein may be replaced with other circuits of different construction and of different quantity that, taken as a whole, perform the same or similar function. The general functions of the inventive subject matter may also be performed by significantly different circuitry. In addition, where a single conductor is illustrated or described, it may be replaced by parallel conductors. Where parallel conductors are illustrated or described, they may be replaced by a single conductor.

The various structures of the inventive subject matter may be implemented according to any of various elements and methods known to those skilled in the art. There may be intermediate structure (e.g., amplifiers, attenuators, mixers, multiplexers, inverters, buffers, etc.) or signals that are between two illustrated structures. Some conductors may not be continuous as illustrated, but rather they may be broken up by intermediate structure. The borders of boxes in the figures are for illustrative purposes only. An actual device would not have to include such defined boundaries. Further, the relative sizes and/or layouts of the illustrated elements are not to suggest actual relative sizes and/or layouts.

The various procedures described herein can be implemented in hardware, firmware or software. A software implementation could use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, random access memories (RAMs), read only memories (ROMs), and the like.

Although the individual operations of the procedures of FIGS. 8, 9, and 12 are illustrated and described as separate operations, one or more of the individual operations may be performed concurrently. Further, nothing requires that the operations be performed in the orders illustrated.

The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Therefore, it is manifestly intended that the inventive subject matter be limited only by the claims and the equivalents thereof.

It is emphasized that the Abstract is provided to comply with 37 C.F.R. §1.72(b) requiring an Abstract that will allow the reader to ascertain the nature and gist of the technical disclosure. It is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

The invention claimed is:

1. A method comprising:
    calibrating a wireless access point, which includes at least two antenna subsystems, wherein a first antenna subsystem includes a first transmit chain and a first receive chain, and a second antenna subsystem includes a second transmit chain and a second receive chain, and wherein calibrating includes adjusting a gain of at least one of the first antenna subsystem and the second antenna subsystem so that a first gain ratio between the first transmit chain and the first receive chain approximately equals a second gain ratio between the second transmit chain and the second receive chain.

2. The method of claim 1, further comprising:
    the first transmit chain transmitting a first signal, which represents a modified version of first input data;
    the second receive chain receiving the first signal and producing a modified version of the first signal as first output data;
    the second transmit chain transmitting a second signal, which represents a modified version of second input data;
    the first receive chain receiving the second signal and producing a modified version of the second signal as second output data; and
    wherein calibrating the wireless access point includes adjusting the gain of at least one of the first antenna subsystem and the second antenna subsystem so that the first output data approximately equals the second output data.

3. The method of claim 2, wherein:
    transmitting the first signal comprises transmitting the first signal over a wireless channel; and
    transmitting the second signal comprises transmitting the second signal over the wireless channel.

4. The method of claim 2, wherein:
    transmitting the first signal comprises transmitting the first signal over a wireless channel simulator; and
    transmitting the second signal comprises transmitting the second signal over the wireless channel simulator.

5. A method of calibrating a wireless access point comprising:
    exchanging a plurality of wireless signals with a plurality of antenna subsystems of a wireless access point; and
    calibrating the plurality of antenna subsystems, based on measurements of the wireless signals, so that gain ratios for selected ones of the plurality of antenna subsystems are approximately equal, wherein a gain ratio is a ratio of an antenna subsystem's transmit chain gain to an antenna subsystem's receive chain gain.

6. The method of claim 5, wherein calibrating the plurality of antenna subsystems comprises adjusting at least one gain of at least one transmit chain.

7. The method of claim 5, wherein calibrating the plurality of antenna subsystems comprises adjusting at least one gain of at least one receive chain.

8. A method of calibrating a wireless access point comprising:
    a transmit chain of a first antenna subsystem transmitting a first signal, which represents a modified version of first input data;
    a receive chain of a second antenna subsystem receiving the first signal and producing a modified version of the first signal as first output data;
    a transmit chain of the second antenna subsystem transmitting a second signal, which represents a modified version of second input data;
    a receive chain of the first antenna subsystem receiving the second signal and producing a modified version of the second signal as second output data; and
    adjusting a gain of at least one of the first antenna subsystem and the second antenna subsystem so that the first output data gain ratio approximately equals the second output data gain ratio.

9. The method of claim 8, further comprising:
    a receive chain of a third antenna subsystem receiving the first signal and producing a modified version of the first signal as third output data;
    a transmit chain of the third antenna subsystem transmitting a third signal, which represents a modified version of third input data;
    the receive chain of the first antenna subsystem receiving the third signal and producing a modified version of the third signal as fourth output data; and
    adjusting a gain of at least one of the first antenna subsystem and the third antenna subsystem so that the third output data approximately equals the fourth output data.

10. The method of claim 8, further comprising:
    the transmit chain of the first antenna subsystem transmitting a third signal, which represents a modified version of third input data;
    a receive chain of a third antenna subsystem receiving the third signal and producing a modified version of the third signal as third output data;
    a transmit chain of the third antenna subsystem transmitting a fourth signal, which represents a modified version of fourth input data;
    the receive chain of the first antenna subsystem receiving the fourth signal and producing a modified version of the fourth signal as fourth output data; and
    adjusting a gain of at least one of the first antenna subsystem and the third antenna subsystem so that the third output data approximately equals the fourth output data.

11. The method of claim 8, further comprising:
the transmit chain of the second antenna subsystem transmitting a third signal, which represents a modified version of third input data;
a receive chain of a third antenna subsystem receiving the third signal and producing a modified version of the third signal as third output data;
a transmit chain of the third antenna subsystem transmitting a fourth signal, which represents a modified version of fourth input data;
the receive chain of the second antenna subsystem receiving the fourth signal and producing a modified version of the fourth signal as fourth output data; and
adjusting a gain of at least one of the second antenna subsystem and the third antenna subsystem so that the third output data approximately equals the fourth output data.

12. A method of calibrating a wireless access point comprising:
computing a plurality of receive chain gains of a plurality of receive chains of a plurality of antenna subsystems;
computing a plurality of transmit chain gains of a plurality of transmit chains of the plurality of antenna subsystems; and
adjusting one or more gains of one or more of the plurality of receive chains and the plurality of transmit chains so that gain ratios for selected ones of the plurality of antenna subsystems are approximately equal, wherein a gain ratio is a ratio between an antenna subsystem's transmit chain gain to the antenna subsystem's receive chain gain.

13. The method of claim 12, wherein computing the plurality of receive chain gains comprises applying an input signal to selected ones of the plurality of receive chains, measuring output signals of the selected ones of the plurality of receive chains, and comparing the output signals to the input signal.

14. The method of claim 12, wherein computing the plurality of transmit chain gains comprises, for a selected antenna subsystem, subtracting a receive chain gain for the antenna subsystem from a total gain through a transmit chain of the antenna subsystem and the receive chain of the antenna subsystem.

15. An apparatus of calibrating a wireless access point comprising:
a first antenna subsystem, which includes a first transmit chain and a first receive chain; a second antenna subsystem, which includes a second transmit chain and a second receive chain; and
a processing element, which is operable to adjust a gain of at least one of the first antenna subsystem and the second antenna subsystem so that a first gain ratio between the first transmit chain and the first receive chain approximately equals a second gain ratio between the second transmit chain and the second receive chain.

16. The apparatus of claim 15, further comprising at least one additional antenna subsystem.

17. The apparatus of claim 15, further comprising a channel simulator, operably connected between the first antenna subsystem and the second antenna subsystem, over which the first signal and the second signal are transmitted.

18. The apparatus of claim 15, further comprising a calibration signal source, operably connected to the first receive chain and the second receive chain, which provides the first calibration signal and the second calibration signal.

19. The apparatus of claim 15, further comprising:
a first coupling circuit, operably connected between the first transmit chain and the first receive chain; and
a second coupling circuit, operably connected between the second transmit chain and the second receive chain.

20. A wireless local area network access point comprising:
a first antenna subsystem, which includes a first transmit chain and a first receive chain;
a second antenna subsystem, which includes a second transmit chain and a second receive chain; and
a processing element, which is operable to adjust a gain of at least one of the first antenna subsystem and the second antenna subsystem so that a first gain ratio between the first transmit chain and the first receive chain approximately equals a second gain ratio between the second transmit chain and the second receive chain.

21. The wireless local area network access point of claim 20, further comprising a channel simulator, operably connected between the first antenna subsystem and the second antenna subsystem, over which the first signal and the second signal are transmitted.

22. The wireless local area network access point of claim 20, further comprising a calibration signal source, operably connected to the first receive chain and the second receive chain, which provides the first calibration signal and the second calibration signal.

23. The wireless local area network access point of claim 20, further comprising:
a first coupling circuit, operably connected between the first transmit chain and the first receive chain; and
a second coupling circuit, operably connected between the second transmit chain and the second receive chain.

24. A system comprising:
an access point, which includes
a first antenna subsystem, which includes a first transmit chain and a first receive chain,
a second antenna subsystem, which includes a second transmit chain and a second receive chain, and
a processing element, which is operable to adjust a gain of at least one of the first antenna subsystem and the second antenna subsystem so that a first gain ratio between the first transmit chain and the first receive chain approximately equals a second gain ratio between the second transmit chain and the second receive chain; and
a plurality of stations, which are capable of transmitting first information to and receiving second information from the access point.

25. The system of claim 24 wherein the system is a spatial-division, multiple-access system.

26. The system of claim 24, wherein the system is a wireless local area network system.

27. A computer-readable medium having program instructions stored thereon to perform a method of calibrating a wireless access point, which when executed within the wireless access point, result in:
calibrating a wireless access point, which includes at least two antenna subsystems, wherein a first antenna subsystem includes a first transmit chain and a first receive chain, and a second antenna subsystem includes a second transmit chain and a second receive chain, and wherein calibrating includes adjusting a gain of at least one of the first antenna subsystem and the second antenna subsystem so that a first gain ratio between the first transmit chain and the first receive chain approximately equals a second gain ratio between the second transmit chain and the second receive chain.

28. The computer-readable medium of claim 27, wherein the method, when executed, further results in:
the first transmit chain transmitting a first signal, which represents a modified version of first input data;
the second receive chain receiving the first signal and producing a modified version of the first signal as first output data;
the second transmit chain transmitting a second signal, which represents a modified version of second input data;
the first receive chain receiving the second signal and producing a modified version of the second signal as second output data; and
wherein calibrating the wireless access point includes adjusting the gain of at least one of the first antenna subsystem and the second antenna subsystem so that the first output data approximately equals the second output data.

29. The computer-readable medium of claim 27, wherein:
transmitting the first signal comprises transmitting the first signal over a wireless channel; and
transmitting the second signal comprises transmitting the second signal over the wireless channel.

30. The computer-readable medium of claim 27, wherein:
transmitting the first signal comprises transmitting the first signal over a wireless channel simulator; and
transmitting the second signal comprises transmitting the second signal over the wireless channel simulator.

31. A system comprising:
an access point capable of receiving first information from and transmitting second information to a plurality of stations, wherein the access point includes
a first antenna subsystem, which includes a first transmit chain and a first receive chain,
a second antenna subsystem, which includes a second transmit chain and a second receive chain, and
a processing element, which is operable to adjust a gain of at least one of the first antenna subsystem and the second antenna subsystem so that a first gain ratio between the first transmit chain and the first receive chain approximately equals a second gain ratio between the second transmit chain and the second receive chain.

32. The system of claim 31, wherein the system is a spatial-division, multiple-access system.

33. The system of claim 31, wherein the system is a wireless local area network system.

* * * * *